United States Patent
Iwata et al.

(10) Patent No.: US 8,640,671 B2
(45) Date of Patent: Feb. 4, 2014

(54) BEARING DEVICE

(75) Inventors: Shinji Iwata, Obu (JP); Naotaka Yoshikawa, Chita (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 769 days.

(21) Appl. No.: 12/654,357

(22) Filed: Dec. 17, 2009

(65) Prior Publication Data
US 2010/0192893 A1 Aug. 5, 2010

(30) Foreign Application Priority Data

Feb. 2, 2009 (JP) ................................ 2009-021312

(51) Int. Cl.
*F02B 31/00* (2006.01)
*F01L 3/00* (2006.01)

(52) U.S. Cl.
USPC ......................... 123/308; 123/188.1; 384/266

(58) Field of Classification Search
USPC ........... 123/184.55, 188.1, 188.3, 189, 190.1, 123/190.5, 308, 336, 337, 361, 399, 583; 251/214, 304, 305, 308; 384/275, 297, 384/129, 266, 427–429, 442, 456, 461; 137/15.25, 315.22, 595
See application file for complete search history.

(56) References Cited

U.S. PATENT DOCUMENTS

| 4,622,997 | A | * | 11/1986 | Paddington | .................... | 137/595 |
| 4,817,374 | A | * | 4/1989 | Kitta | ................................ | 60/313 |
| 5,251,665 | A | * | 10/1993 | Schaufeld | ..................... | 137/554 |
| 6,568,417 | B2 | * | 5/2003 | Laney | ......................... | 137/15.25 |
| 6,604,506 | B2 | * | 8/2003 | Tanaka et al. | .................. | 123/336 |
| 6,979,130 | B1 | | 12/2005 | Stangier et al. | | |
| 7,721,705 | B2 | * | 5/2010 | Sato et al. | ...................... | 123/336 |
| 7,913,389 | B2 | * | 3/2011 | Hutchinson | ............. | 29/890.127 |
| 8,015,958 | B2 | * | 9/2011 | Vichinsky et al. | ........ | 123/184.55 |
| 2001/0017124 | A1 | * | 8/2001 | Kotouge | ....................... | 123/306 |
| 2003/0106525 | A1 | * | 6/2003 | Morgillo et al. | ............... | 123/336 |
| 2004/0244768 | A1 | * | 12/2004 | Udono | .......................... | 123/336 |
| 2005/0188950 | A1 | * | 9/2005 | Mehne et al. | ................. | 123/308 |
| 2006/0086392 | A1 | * | 4/2006 | Nakayama | ..................... | 137/595 |
| 2006/0278268 | A1 | * | 12/2006 | Hutchinson et al. | ........ | 137/15.25 |
| 2007/0175432 | A1 | * | 8/2007 | Yakabe et al. | ............ | 123/184.57 |
| 2008/0149064 | A1 | * | 6/2008 | Shibata et al. | ............ | 123/195 A |
| 2008/0310787 | A1 | * | 12/2008 | Waseda et al. | ................ | 384/572 |
| 2009/0028482 | A1 | * | 1/2009 | Iwata et al. | .................... | 384/429 |

FOREIGN PATENT DOCUMENTS

| JP | U-58-154858 | 10/1983 |
| JP | A 4-503548 | 6/1992 |
| JP | A-2001-303960 | 10/2001 |
| JP | A-2002-106370 | 4/2002 |

(Continued)

OTHER PUBLICATIONS

Jul. 24, 2012 Office Action issued in Japanese Patent Application No. 2009-021312 (with translation).

*Primary Examiner* — John T. Kwon
*Assistant Examiner* — Johnny Hoang
(74) *Attorney, Agent, or Firm* — Oliff PLC (57) ABSTRACT

A bearing device includes a plurality of pairs of bearing parts for supporting shafts to each of which a plurality valves are attached and connecting parts for connecting the bearing parts.
Each connecting part is elastically deformable and includes a bent portion in a bent shape to absorb the force that will act in at least one of an axial direction and a radial direction of the shafts when the shafts are rotated.

14 Claims, 9 Drawing Sheets

(56) References Cited

FOREIGN PATENT DOCUMENTS

| JP | A 2003-509634 | 3/2003 |
| JP | A 2005-315258 | 11/2005 |
| JP | A-2006-161885 | 6/2006 |
| JP | A 2006-214299 | 8/2006 |
| WO | WO 90/10144 A1 | 9/1990 |

* cited by examiner

BEARING DEVICE

CROSS-REFERENCE TO RELATED APPLICATIONS

This application is based upon and claims the benefit of priority from the prior Japanese Patent Application No. 2009-021312 filed on Feb. 2, 2009, the entire contents of which are incorporated herein by reference.

TECHNICAL FIELD

The present invention relates to a bearing device for supporting a shaft of a valve.

BACKGROUND ART

Heretofore, in an intake passage of an internal combustion engine, for example, a flap valve (a butterfly valve) is provided in order to change over the intake pipe length and regulate the flow of intake air (swirling flow, tumbling flow), and so on. This flap valve is fixed to the shaft. The shaft is rotatably supported by a bearing. When this shaft is rotated, the flap valve is also rotated.

Meanwhile, regarding a technique of supporting a shaft of a flap valve, for example JP2005-315258A discloses a flap valve device configured such that separate bearing members are mounted respectively in a plurality of divided passages of an intake passage in an internal combustion engine, and flap valves are supported by those bearing members. In this device, the shaft of each flap valve is covered in an angular range wider than 180° by the bearing members. Accordingly, each bearing part has a simple structure and a mounting operation is facilitated.

SUMMARY OF INVENTION

Technical Problem

However, the aforementioned technique requires mounting the separate bearing members in the different passages individually and thus the operation of mounting the bearing members would be troublesome. In the case where the bearing members have large dimensional differences and mounting errors, sliding resistance of the shafts increases during rotation, needing a large operation torque of the flap valve.

The present invention has a purpose to provide a bearing device capable of achieving improved mountability and reduced sliding resistance during rotation of a shaft.

Solution to Problem

To achieve the above purpose, one aspect of the invention provides a bearing device comprising: a pair of bearing parts for supporting a shaft of a valve; and a first connecting part connecting the pair of bearing parts, the connecting part being formed to be elastically deformable.

DESCRIPTION OF EMBODIMENTS

A detailed description of a preferred embodiment of a bearing device of the present invention will now be given referring to the accompanying drawings. In this embodiment explained below, the invention is applied to a bearing device for supporting a shaft of a valve placed in an intake passage member of a V-8 cylinder engine. This valve is provided to change over the intake pipe length.

Figure 1:
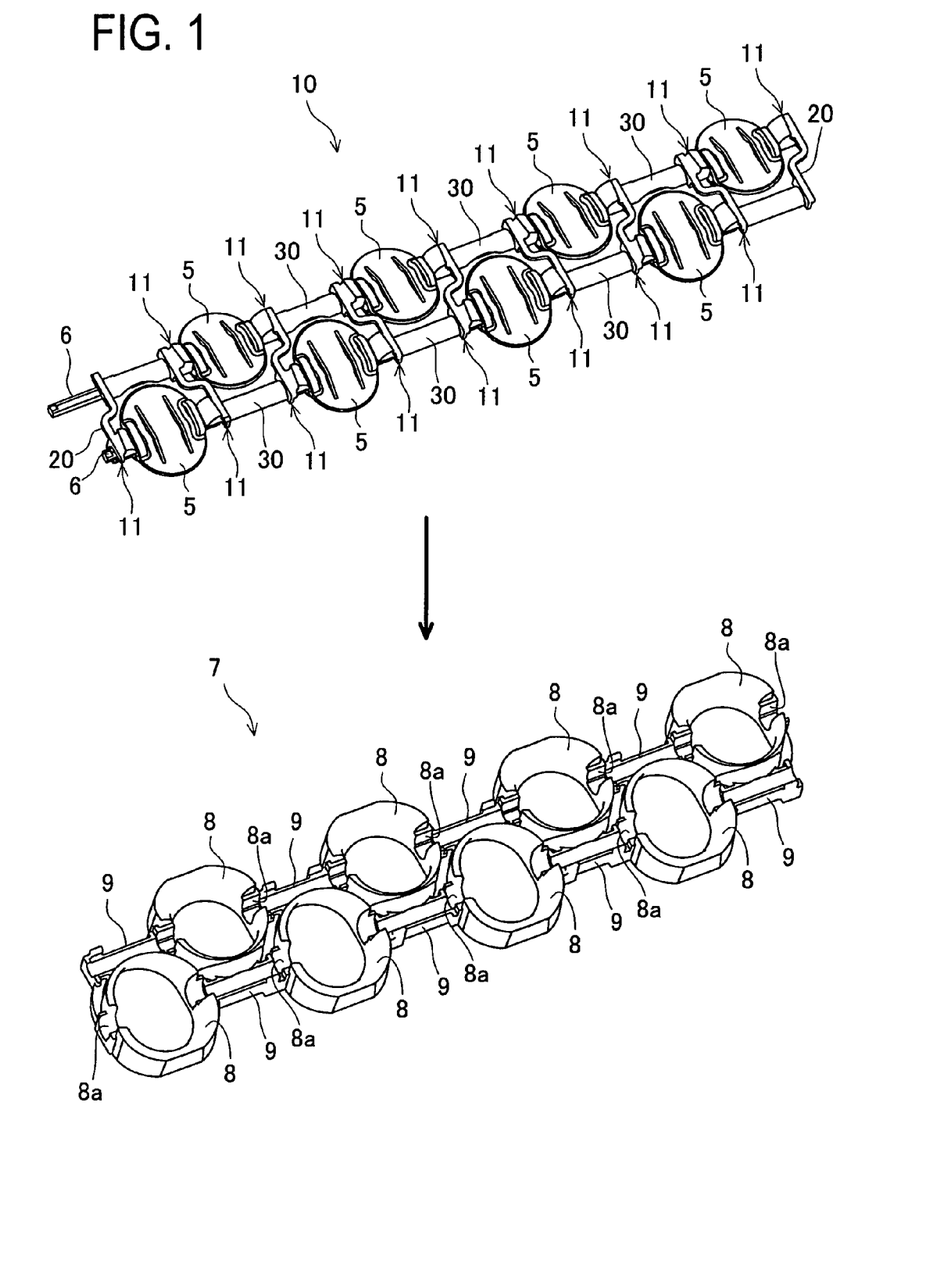
FIG. 1 is a perspective view showing a bearing device and an intake passage member in which the bearing device is mounted in an embodiment of the invention.
Figure 2:
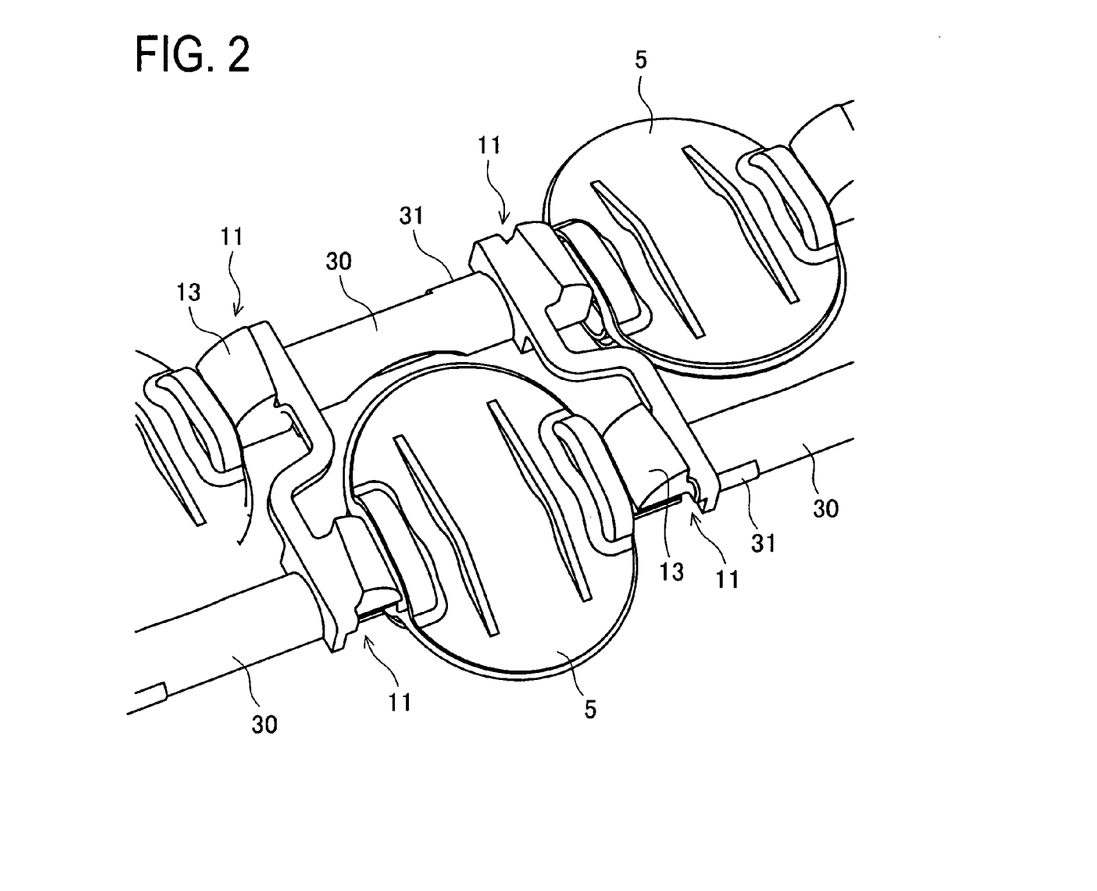
FIG. 2 is a partial enlarged view of part of the bearing device.

A whole configuration of the bearing device in this embodiment is first explained with reference to FIGS. 1 and 2. FIG. 1 is a perspective view of the bearing device in this embodiment and an intake passage member in which the bearing device is to be mounted. FIG. 2 is a partial enlarged view of the bearing device.

A bearing device 10 includes a plurality of bearing parts 11 for supporting shafts 6 of valves 5 as shown in FIGS. 1 and 2. In this embodiment, two shafts 6 are arranged in parallel at a predetermined spaced interval. Each shaft 6 is of a rectangular or hexagonal cross section.

Each valve 5 is a butterfly valve having an almost disc shape. Eight valves 5 are arranged to match the number of cylinders. To be specific, the valves 5 are placed so that four valves are disposed in each shaft 6 at equal intervals to correspond to the positions of funnels 8 of an intake passage member 7 mentioned later. A shaft hole of each valve 5 is formed for example in a rectangular or hexagonal cross section. Herein, the shaft hole of each valve 5 is preferably formed in a hexagonal cross section. Accordingly, the diameter of the shaft 6 can be made smaller than in a rectangular cross section. Also, one(s) of flat faces defining the shaft hole of each valve, located on the valve surface side, in which an amount of shrinkage of the hole diameter is large can be reduced or eliminated. The accuracy of the shaft hole diameter can be improved and thus each valve 5 can be firmly fixed to the shaft 6. The shaft hole of each valve 5 is preferably formed with a center part having a smaller diameter. This is to facilitate manufacture of the valve 5 and mounting of the shaft 6 as compared with the case where the shaft hole is formed to have a entirely uniform diameter so that the shaft 6 is press-fitted throughout the shaft hole and the case where both ends of the shaft hole is formed to have a smaller so that the shaft 6 is press-fitted in each end of the shaft hole.

Figure 3:
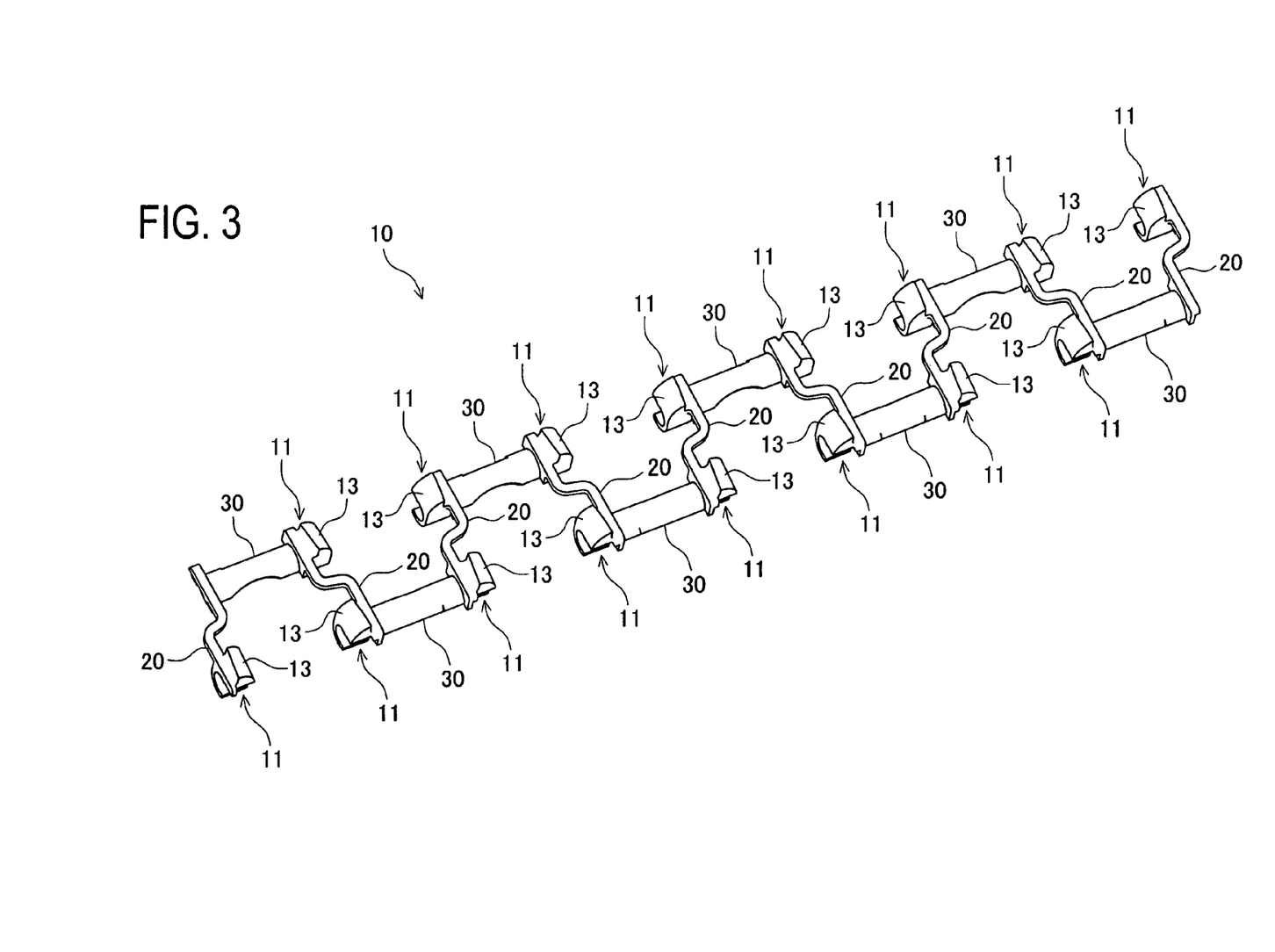
FIG. 3 is a perspective view of the bearing device before valves are not mounted.
Figure 4:
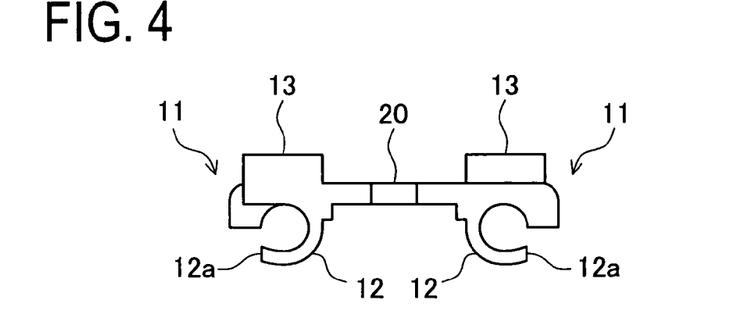
FIG. 4 is a side view of the bearing device viewed in an axial direction.
Figure 5:
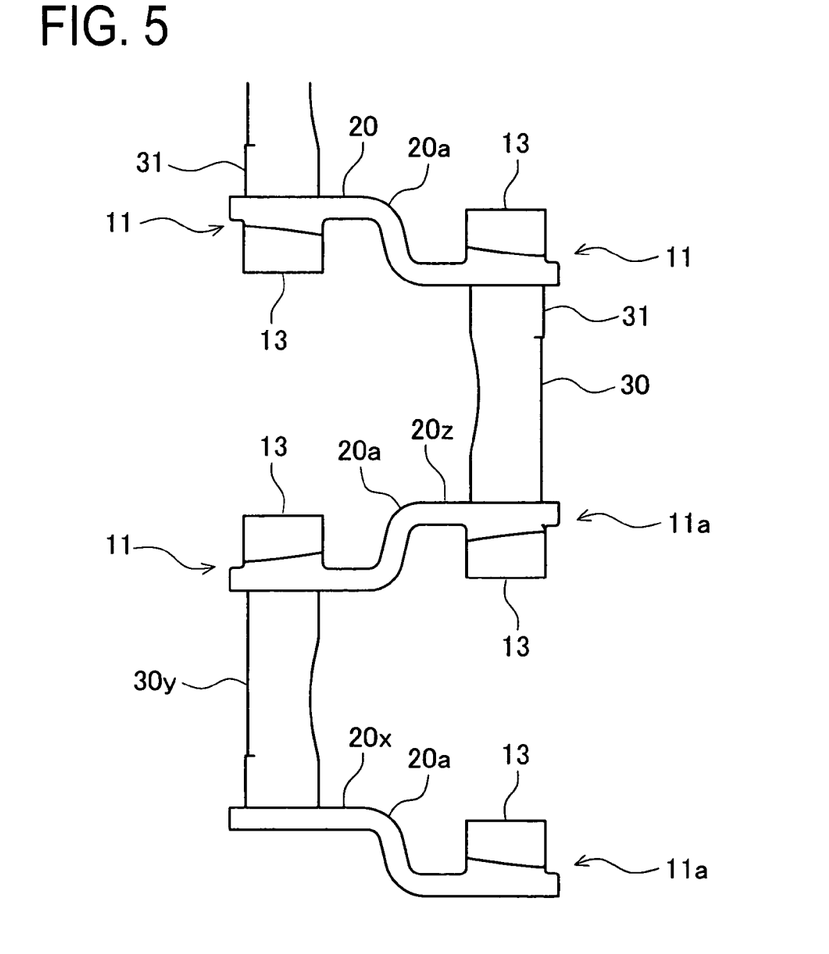
FIG. 5 is a top view showing a connected state of bearing parts in the bearing device.

A bearing part 11 in this embodiment is explained below with reference to FIGS. 3 to 5. FIG. 3 is a perspective view showing the bearing device before the valves are mounted in this embodiment. FIG. 4 is a side view of the bearing device in an axial direction. FIG. 5 is a top view showing a connected state of the bearing parts in the bearing device.

Eight pairs of bearing parts 11 are placed as shown in FIG. 3 so that four pairs thereof are arranged along an axial direction of each shaft 6 to support both sides of each valve 5. Thus, a plurality of pairs of the bearing parts 11 are located along the axial direction of the shafts 6, thereby reliably supporting the long shafts 6 which will operate the plurality of valves 5. As shown in FIG. 4, each bearing part 11 includes a funnel portion 13 to be mounted in the intake passage member 7 to form a part of the funnel 8 of the intake passage member 7 (see FIG. 1) and a C-shaped ring portion 12 having a smaller diameter than the shaft 6 to circumferentially cover the shaft 6.

The ring portion 12 includes a shaft insertion opening 12a through which the shaft 6 is in the ring portion 12. This opening 12a is elastically deformable. When the shaft 6 is to be inserted in the ring portion 12, the shaft insertion opening 12a of the ring portion 12 is elastically deformed, allowing the shaft 6 to be easily inserted in the ring portion 12. Furthermore, the ring portion 12 is smaller in diameter than the shaft 6 and accordingly can firmly hold the shaft 6 inserted in the ring portion 12.

Herein, as shown in FIG. 5, the bearing parts 11 are connected by connecting parts 20 each extending in a radial direction of the shaft 6 to connect the adjacent bearing parts 11 across the shafts 6 and connecting parts 30 each extending in an axial direction of the shafts 6 to connect the bearing parts 11 in each pair. In other words, all eight pairs of the bearing parts 11 are connected by the connecting parts 20 and 30. Since all the bearing parts 11 are connected by the connecting parts 20 and 30 as above, the bearing parts 11 can be easily mounted in the intake passage member 7 in a single work. In particular, even when the bearing device is to be used in a V-8 cylinder engine for which long shafts need to be arranged in parallel as in this embodiment, the bearing parts 11 can be mounted easily in the intake passage member 7 in a single work and hence mounting workability can be considerably improved.

Each connecting part 20 is formed to be elastically deformable and include a bent portion 20a bent to absorb the force acting in the axial direction and the radial direction of the shaft 6. In this embodiment, the bent portion 20a is formed as a center part of the connecting part 20 that is bent in a cranked shape on a plane including each shaft 6. Since each connecting part 20 is elastically deformable, mounting of the bearing device 10 in the intake passage member 7 can be facilitated. In this bearing device 10, even if dimensional differences and mounting errors are large between the bearing parts 11, each bent portion 20a absorbs the force acting in the axial direction and the radial direction of each shaft 6 during rotation of the shafts 6 after the bearing device 10 is mounted in the intake passage member 7. This makes it possible to reduce sliding resistance caused during rotation of the shafts 6.

Each connecting part 30 has a semi-cylindrical shape which covers an upper half of the shaft 6 in a radial direction thereof. Each connecting part 30 is formed on its outer periphery with an engagement portion 31 engage able with an engagement claw 9a provided in a guide 9 of the intake passage member 7 mentioned later. In this embodiment, for example, one pair of the bearing parts 11a are connected by connecting parts 20x, 30y, and 20z. The assembly constituted of those connecting parts 20x, 30y, and 20z corresponds to one example of a "first connecting part" of this invention. Other pairs of the bearing parts 11 are connected to each other in a similar manner. Each connecting part 30 singly connects one pair of the bearing parts 11 to another pair. This connecting part 30 is an example of a "second connecting part" of the invention. Each connecting part 20z connects the adjacent bearing parts 11 supporting different shafts 6 respectively. This connecting part 20z is an example of a "third connecting part" of the invention.

All of the bearing parts 11, the connecting parts 20, and the connecting parts 30 mentioned above are integrally formed of resin. Since they are integrally formed of resin, the bearing device 10 in this embodiment can be easily produced. Furthermore, the number of components of the bearing device 10 can be reduced, improving the mountability, resulting in reduced manufacturing cost.

Figure 6:
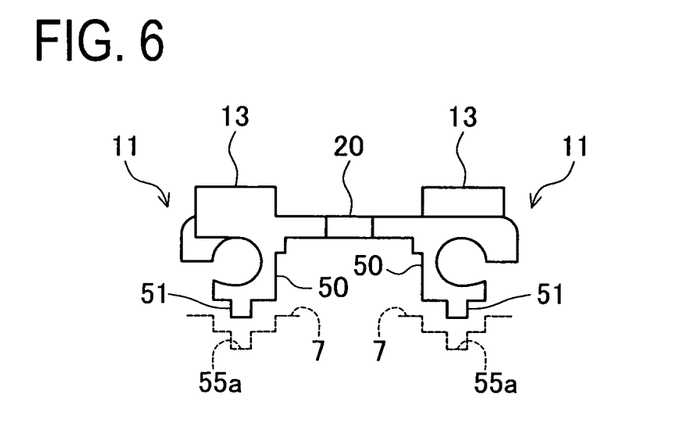
FIG. 6 is a side view of a bearing device in a first modified example viewed in an axial direction.
Figure 7:
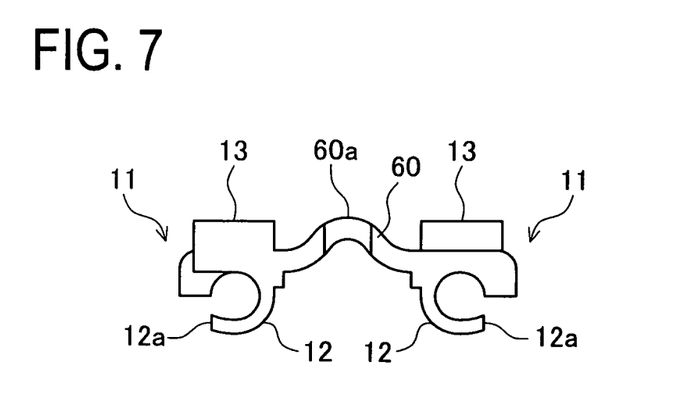
FIG. 7 is a side view of a bearing device in a second modified example viewed in an axial direction.

Modified examples of the bearing device 10 are explained below with reference to FIGS. 6 and 7. FIG. 6 is a side view of a bearing device in a first modified example viewed in the axial direction. FIG. 7 is a side view of a bearing device in a second modified example viewed in the axial direction. In the following modified examples, similar or identical components to those in the above embodiment are given the same reference signs and their details are not explained below.

First Modified Example

The bearing device in the first modified example differs from the bearing device in the above embodiment in that each bearing part 11 includes a protrusion 51 on the bottom of a ring portion 50 which will circumferentially cover the shaft 6 as shown in FIG. 6. When this first modified example is adopted, an intake passage member 7 is formed with recesses 55a each of which is engageable with the corresponding protrusion 51 of the ring portion 50. When the bearing device 10 is mounted in the intake passage member 7 formed with the recesses 55a, the protrusions 51 of the ring portions 50 are fitted in the recesses 55a of the intake passage member 7. This protrusion 51 is an example of an "engagement part" of the invention.

According to the bearing device in the first modified example, when the bearing parts 11 are mounted in the intake passage member 7, not only the shafts 6 of the valves 5 placed in the intake passage member 7 can be supported but also the bearing parts 11 can be positioned reliably in place with respect to the intake passage member 7. This makes it possible to prevent the bearing parts 11 from becoming displaced in the axial direction and the radial direction of the shafts 6.

Second Modified Example

A bearing device in a second modified example differs from the aforementioned bearing device (the connecting part 20) in that each connecting part 60 extending in a radial direction of the shafts 6 to connect bearing parts 11 for supporting shafts 6 includes a curved portion 60a curved upward as well as in a perpendicular direction with respect to the drawing sheet of FIG. 7.

In the bearing device in the second modified example, when the bearing device is to be mounted in an intake passage member 7, the connecting part 60 can be elastically deformed at the curved portion 60a. This can facilitate mounting of the bearing device in the intake passage member 7. Even when the bearing parts 11 have large dimensional differences and mounting errors, the curved portions 60a absorb the force acting in the axial direction and the radial direction of each shaft 6 during rotation thereof after the bearing device is mounted in the intake passage member 7, thereby reducing sliding resistance caused during rotation of each shaft 6.

Figure 8:
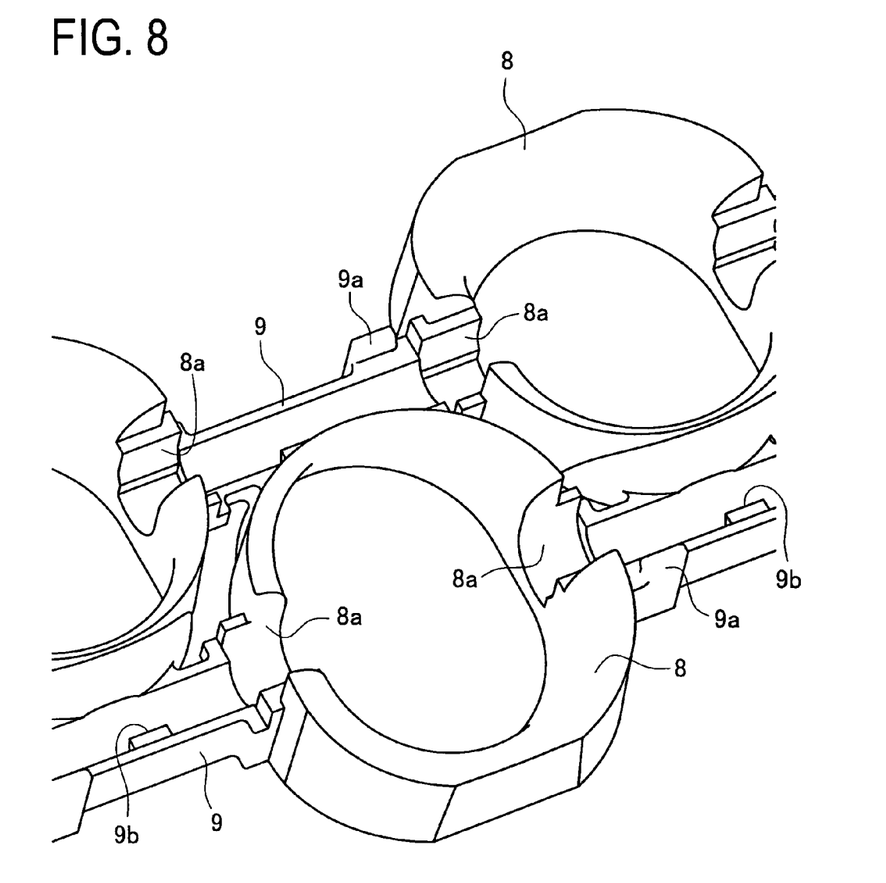
FIG. 8 is a perspective view showing an intake passage member in which the bearing device is to be mounted in the embodiment.

The following explanation is given to the intake passage member 7 in which the bearing device 10 having the above configuration is to be mounted, referring to FIGS. 1 and 8. FIG. 8 is a perspective view showing the intake passage member 7 in which the bearing device in this embodiment is to be mounted.

The intake passage member 7 constitutes a part of an intake manifold for supplying intake air to each cylinder of an engine. This intake passage member 7 includes funnels 8 forming open ends of branches of an intake passage each communicating with a corresponding cylinder and guides 9 for holding shafts 6 by covering the lower part of each shaft 6, as shown in FIG. 8.

In this embodiment, eight funnels 8 are provided to match the number of cylinders. Each funnel 8 includes recesses 8a in each of which the funnel portion 13 of the bearing part 11 is fitted. When the bearing device 10 is mounted in the intake passage member 7, the funnel portions 13 of the bearing parts 11 are fitted in the recesses 8a of the intake passage member 7, constituting each entire funnel 8.

Each guide 9 has a semi-cylindrical shape to connect the recesses 8a of the funnels 8. This guide 9 includes a protrusion 9b formed to protrude inward toward the shaft 6 and a claw 9a engageable with the engagement portion 31 of the connecting part 30 in the bearing device 10. When the shafts 6 and the bearing parts 11 are mounted in the intake passage member 7, each protrusion 9b is inserted in a recess formed in the shaft 6, thereby holding the shaft 6 against displacement in the axial direction. When the claw 9a of each guide 9 engages with the engagement portion 31 of each connecting part 30, the bearing device 10 can be positioned and fixed with respect to the intake passage member 7.

The procedure of mounting the bearing device 10 having the above configuration in the intake passage member 7 is briefly explained below. Before the bearing device 10 is mounted in the intake passage member 7, firstly, the valves 5 are fixed to the shafts 6. This fixing of the valves 5 is conducted for example by press-fitting the shaft 6 into a shaft hole of each valve 5. Two shafts 6 to which the valves 5 are fixed are inserted in the ring portions 12 through respective insertion openings 12a in the bearing device 10. Then, the bearing device 10 is mounted in the intake passage member 7.

In the present embodiment, the funnel portions 13 of the bearing device 10 are inserted in the recesses 8a of the intake passage member 7, the protrusions 9b of the guides 9 of the intake passage member 7 are inserted in the recesses of the shafts 6, and the engagement portions 31 of the bearing device 10 are engaged with the claws 9a of the intake passage member 7. Thus, the bearing device 10 is completely mounted in the intake passage member 7. However, in case the bearing device 10 has large dimensional differences, it is likely difficult to mount the bearing device 10 in the intake passage member 7.

On the contrary, in the bearing device 10 in the present embodiment, the connecting parts 20 are elastically deformable and thus the connecting parts 20 are deformed to some extent in mounting the bearing device 10 in the intake passage member 7. Thus, the bearing device 10 can be easily mounted in the intake passage member 7. In this bearing device 10, even when the bearing parts 11 have large dimensional differences and mounting errors, the connecting parts 20 are elastically deformed during rotation of the shafts 6, thereby reducing sliding resistance caused during rotation of the shafts 6. As a result, the operation torque of the valves 5 can be reduced.

Figure 9:
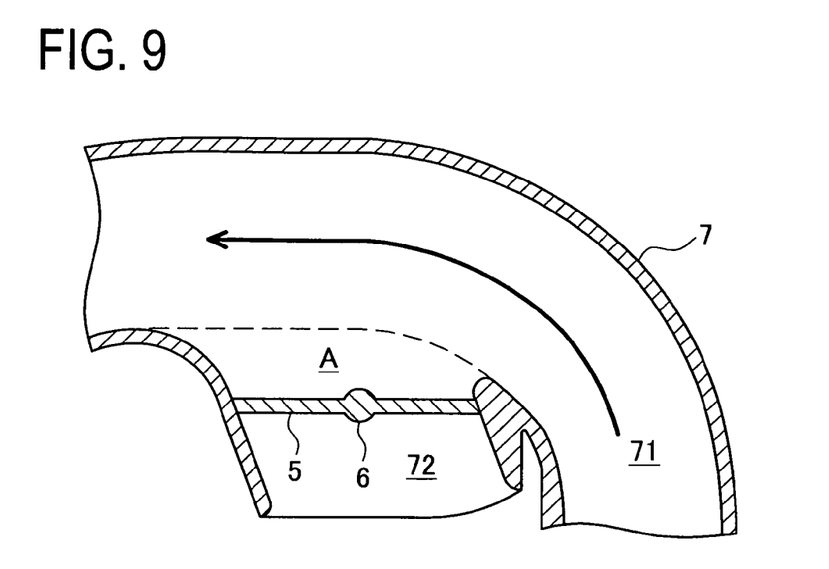
FIG. 9 is a sectional view showing a closed state of a valve mounted in the intake passage member.
Figure 10:
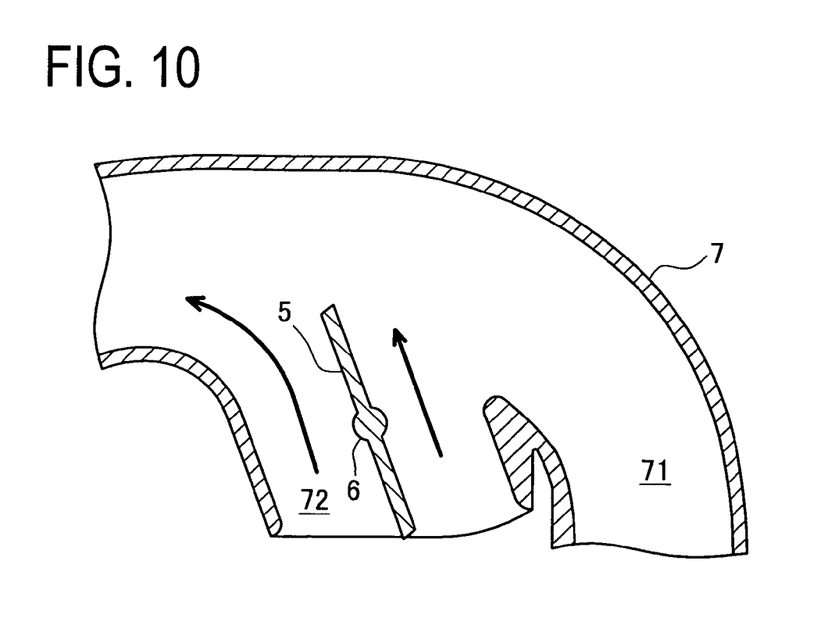
FIG. 10 is a sectional view showing an open state of the valve mounted in the intake passage member.

Operations of the valves 5 mounted in the intake passage member 7 by use of the aforementioned bearing device 10 are explained below with reference to FIGS. 9 and 10. FIG. 9 is a sectional view showing a closed state of the valve mounted in the intake passage member: FIG. 10 is a sectional view showing an open state of the valve mounted in the intake passage member. In FIGS. 9 and 10, a thick arrow represents the flow of intake air.

As shown in FIGS. 9 and 10, the intake passage member 7 includes a medium/low-speed passage 71 to supply intake air to an engine during medium/low speed running and a high-speed passage 72 to supply intake air to the engine during high speed running. The medium/low speed passage 71 includes a curved path. The high-speed passage 72 is formed to join with a downstream side of the medium/low-speed passage 71 and have an intake pipe length shorter than the medium/low-speed passage 71. The shaft 6 of the valve 5 is placed near a junction of the medium/low-speed passage 71 and the high-speed passage 72 and inside the high-speed passage 72.

During vehicle medium/low speed running, the shaft 6 is rotated to place the valve 5 in a closed position to close the high-speed passage 72 as shown in FIG. 9. Intake air is therefore supplied to the engine through only the medium/low passage 71.

During vehicle high speed running, the shaft 6 is rotated to place the valve 5 in an open position to open the high-speed passage 72 as shown in FIG. 10. Intake air is therefore supplied to the engine through the high-speed passage 72. Herein, the intake pipe length of each high-speed passage 72 is designed to be shorter than the intake pipe length of each medium/low-speed passage 71. During high speed running, accordingly, the engine can be supplied efficiently with intake air through the shorter intake pipe length.

In the example shown in FIG. 9, meanwhile, the medium/low-speed passage 71 includes a curved path. When the high-speed passage 72 is closed by the disc-shaped butterfly valve 5, a space (a dead space) A is generated in the medium/low-speed passage 71, which is apt to cause turbulence of the pulsating flow of intake air flowing through the medium/low-speed passage 71.

Figure 11:
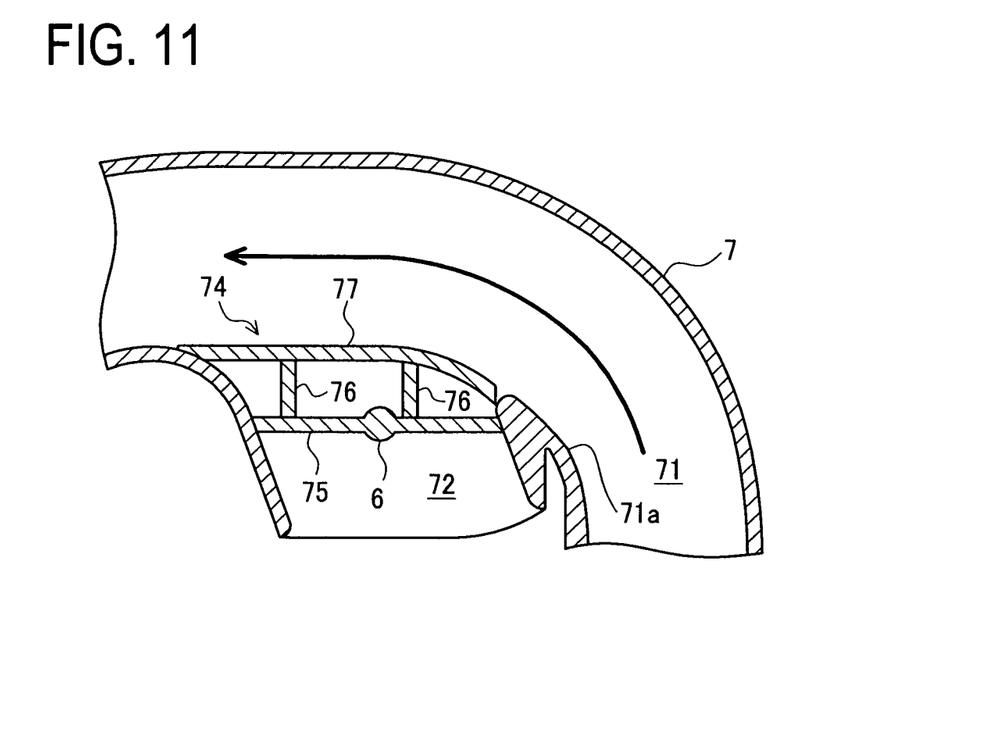
FIG. 11 is a sectional view showing a closed state of a valve structure in a bearing device in a third modified example.
Figure 12:
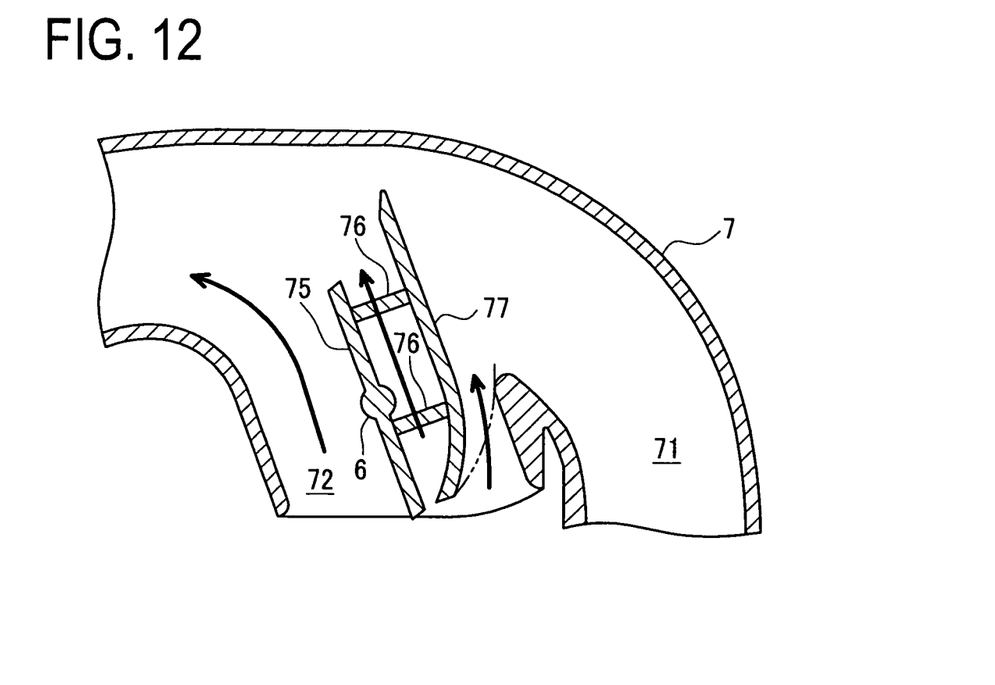
FIG. 12 is a sectional view showing an open state of the valve structure in the bearing device in the third modified example.
Figure 13:
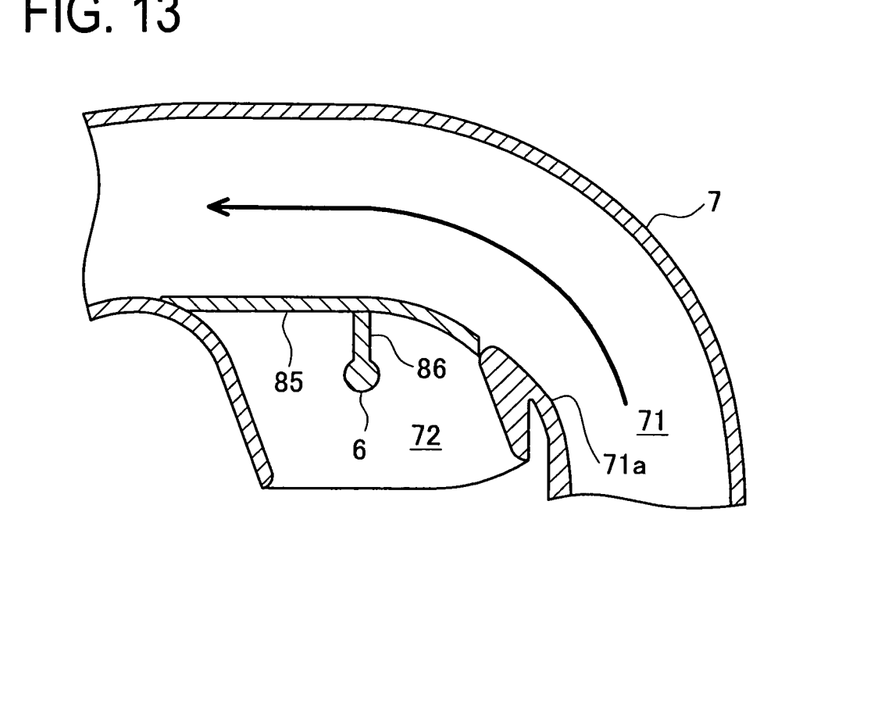
FIG. 13 is a sectional view showing a closed state of a valve structure in a bearing device in a fourth modified example.
Figure 14:
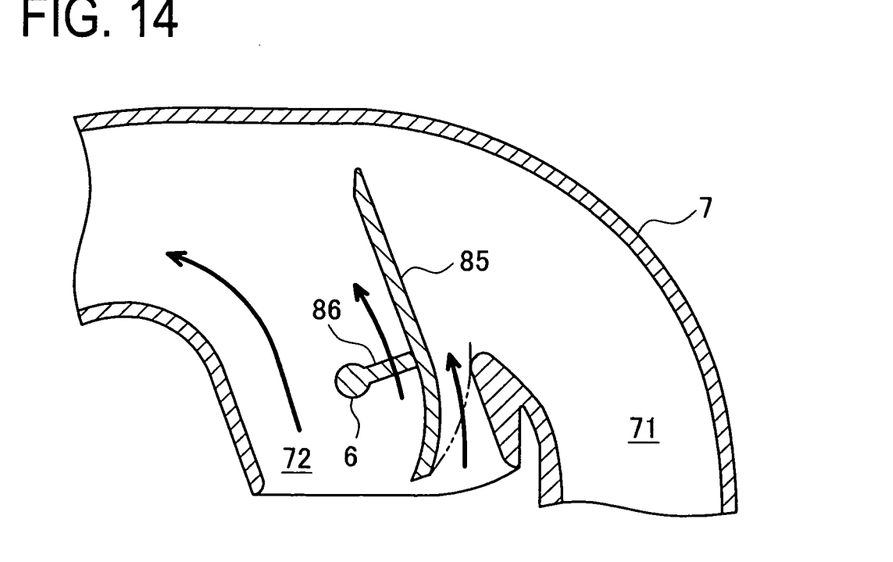
FIG. 14 is a sectional view showing an open state of the valve structure in the bearing device in the fourth modified example.

Modified examples of a bearing device using a valve configured to prevent such turbulence of pulsating intake air flow is explained below with reference to FIGS. 11 to 14. FIG. 11 is a sectional view showing a closed state of a valve in a bearing device in a third modified example. FIG. 12 is a sectional view showing an open state of the valve in the bearing device in the third modified example. FIG. 13 is a sectional view showing a closed state of a valve in a bearing device in a fourth modified example. FIG. 14 is a sectional view showing an open state of the valve in the bearing device in the fourth modified example. In FIGS. 11 to 14, a thick arrow represents the flow of intake air. In FIGS. 12 and 14, a chain double-dashed line represents the path taken by an edge of the valve. In the modified examples explained below, similar or identical components to those in the aforementioned embodiment are given the same reference signs and their details are not explained herein.

Third Modified Example

A valve 74 in the bearing device in the third modified example includes a butterfly valve 75 fixed to a shaft 6 and a roof part 77 connected to the butterfly valve 75 with connecting parts 76 as shown in FIGS. 11 and 12. This butterfly valve 75 in a closed position closes a high-speed passage 72 in order to prevent intake air from flowing from the high-speed passage 72 into a medium/low-speed passage 71. While the butterfly valve 75 is closed, the roof part 77 further seals the high-speed passage 72 on the near side to the medium/low-speed passage 71 than the butterfly valve 75 and also the roof part 77 is placed to continuously extend from a passage wall 71a of the medium/low-speed passage 71 to constitute a part of the medium/low-speed passage 71.

During vehicle medium/low speed running, as shown in FIG. 11, the shaft 6 is rotated, placing the butterfly valve 75 and the roof part 77 in a closed position to doubly close the high-speed passage 72, and the roof part 77 is placed to continuously extend from the passage wall 71a to constitute a part of the medium/low-speed passage 71. Thus, the space A generated in the medium/low-speed passage 71 in the aforementioned embodiment is not generated.

Since the high-speed passage 72 is closed by a double walled configuration as above, the sealing performance can be enhanced. Furthermore, the roof part 77 is placed to extend continuously from the passage wall 71a to form a part of the medium/low-speed passage 71 to avoid generation of the space A. This makes it possible to prevent turbulence of the pulsating flow of intake air flowing through the medium/low-speed passage 71.

During vehicle high speed running, on the other hand, the shaft 6 is rotated to place the butterfly valve 75 and the roof part 77 into an open position to open the high-speed passage 72. Intake air is thus allowed to be supplied to an engine through the high-speed passage 72. Herein, the intake pipe length of the high-speed passage 72 is designed to be shorter than the intake pipe length of the medium/low-speed passage 71. Accordingly, the engine can be supplied efficiently with intake air through the shorter intake pipe length during high speed running.

Fourth Modified Example

A valve 85 in a bearing device in a fourth modified example has an almost disc shape and is connected to a shaft 6 in an eccentric position through a connecting part 86. This valve 85 is configured to seal a high-speed passage 72 and continuously extend from a passage wall 71a of a medium/low-speed passage 71 to constitute a part of a medium/low-speed passage 71 when the valve 85 is in a closed position.

During vehicle medium/low speed running, as shown in FIG. 13, the shaft 6 is rotated, placing the valve 85 in the closed position to close the high-speed passage 72, and the valve 85 placed to continuously extend from the passage wall 71a forms a part of the medium/low-speed passage 71. Thus, the space A generated in the medium/low-speed passage 71 in the aforementioned embodiment is not generated in this configuration.

Since the valve 85 is placed so as to extend continuously from the passage wall 71a, forming a part of the medium/low-speed passage 71 as above, to avoid generation of the space A, it is possible to prevent turbulence of the pulsating flow of intake air flowing through the medium/low-speed passage 71. Furthermore, the valve 85 is designed to be curved along the curved medium/low-speed passage 71 and connected in an eccentric state with the shaft 6. Accordingly, the valve 85 (the invention?) can be easily applied to a curved passage like the medium/low-speed passage 71.

During vehicle high speed running, on the other hand, the shaft 6 is rotated to place the valve 85 in an open position to open the high-speed passage 72 as shown in FIG. 14. Intake air is thus allowed to be supplied to the engine through the high-speed passage 72. The intake pipe length of the high-speed passage 72 is designed to be shorter than that of the medium/low-speed passage 71, so that the engine can be efficiently supplied with intake air through the shorter intake pipe length during high speed running.

As explained above in detail, the bearing device 10 in this embodiment can achieve improved mountability and reduced sliding resistance during rotation of the shaft 6.

The present invention is not limited to the above embodiment and may be embodied in other specific forms without departing from the essential characteristics thereof.

For instance, the above embodiment and modified examples show that the invention is applied to the bearing device supporting two shafts 6 arranged in parallel. However, the number of shafts to be supported and the number of valves fixed to each shaft may be changed appropriately.

In the above embodiment, the invention is applied to the V-8 cylinder engine but not limited thereto. The invention may be applied to any engine in which a butterfly valve is available and to other members.

In the above embodiment, the valve explained as an example is configured to change over the intake pipe length. As an alternative, the invention may be applied to any valve configured to regulate the intake flow (swirling flow, tumbling flow) and others.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A bearing device comprising:
   two or more pairs of bearing parts for supporting a shaft of a valve, the pairs of bearing parts being arranged in an axial direction of the shaft;
   first connecting parts each connecting one bearing part of a pair of the two or more pairs of bearing parts to the other bearing part of the pair of the two or more pairs of bearing parts; and
   one or more second connecting parts, each oriented so as to connect pairs of the bearing parts that are adjacent to each other, wherein:
   the first connecting parts are elastically deformable,
   each of the first connecting parts includes a bent portion in a bent shape to absorb a force that will act in at least one of the axial direction and a radial direction of the shaft,
   each bent portion is bent in a stair-like shape obtained by bending each first connecting part on a plane, and
   the bearing parts, the first connecting parts, and the second connecting parts are integral with one another.

2. The bearing device according to claim 1, wherein the bent portion in the first connecting part includes a curved portion curved upward.

3. The bearing device according to claim 1, wherein
   the second connecting part has a shape to cover a part of the shaft.

4. The bearing device according to claim 1, wherein
   the pairs of bearing parts are placed to support a plurality of the shafts arranged in parallel, and
   the bearing device includes a third connecting part connecting the adjacent bearing parts for supporting different ones of the shafts.

5. The bearing device according to claim 4, wherein
the first connecting parts of adjacent ones of the pairs of bearing parts for supporting different shafts are integral with one another.

6. The bearing device according to claim 4, wherein
the first connecting part includes the second connecting part and the third connecting part.

7. The bearing device according to claim 1, wherein
each bearing part includes a ring portion having a smaller diameter than the shaft and a shape to cover the shaft in a circumferential direction, and a shaft insertion opening disposed in the ring portion, and
the shaft insertion opening is elastically deformable.

8. The bearing device according to claim 1, wherein
each of the bearing parts is configured to support the shaft of the valve to be placed in an intake passage member in an internal combustion engine, and each bearing part includes a funnel passage to form a part of a funnel of the intake passage member when the bearing parts are mounted in the intake passage member.

9. The bearing device according to claim 4, wherein
each of the bearing parts is configured to support the shaft of the valve to be placed in an intake passage member in a V internal combustion engine, and each bearing part includes a funnel passage to form a part of a funnel of the intake passage member when the bearing parts are mounted in the intake passage member.

10. The bearing device according to claim 1, wherein
each of the bearing parts is configured to support the shaft of the valve to be placed in the intake passage member of an internal combustion engine, and each bearing part includes an engagement part engageable with a part of the intake passage member so that each bearing part is positioned in place in the intake passage member when the bearing parts are mounted in the intake passage member.

11. The bearing device according to claim 4, wherein
each of the bearing parts is configured to support the shaft of the valve to be placed in the intake passage member of a V internal combustion engine, and each bearing part includes an engagement part engageable with a part of the intake passage member so that each bearing part is positioned in place in the intake passage member when the bearing parts are mounted in the intake passage member.

12. The bearing device according to claim 1, wherein
the bearing parts and the first connecting part are integrally made of resin.

13. The bearing device according to claim 6, wherein
the bearing parts and the first connecting part are integrally made of resin.

14. The bearing device according to claim 1, wherein
the bent portion is configured to absorb a force that will act in both the axial direction and in the radial direction of the shaft.

* * * * *